United States Patent
Ido et al.

(10) Patent No.: US 6,229,949 B1
(45) Date of Patent: May 8, 2001

(54) POLYMER OPTICAL WAVEGUIDE, OPTICAL INTEGRATED CIRCUIT, OPTICAL MODULE AND OPTICAL COMMUNICATION APPARATUS

(75) Inventors: Tatemi Ido, Kodaira; Hideaki Takano, Kokubunji; Mari Koizumi, Niiza, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/254,199

(22) PCT Filed: Feb. 19, 1997

(86) PCT No.: PCT/JP97/00446

§ 371 Date: Feb. 26, 1999

§ 102(e) Date: Feb. 26, 1999

(87) PCT Pub. No.: WO98/37445

PCT Pub. Date: Aug. 27, 1998

(51) Int. Cl.[7] .................................................. G02B 6/10
(52) U.S. Cl. ............................................ 385/145; 385/132
(58) Field of Search ................................. 385/129–132, 385/141–145, 15, 16, 39–42, 45

(56) References Cited

U.S. PATENT DOCUMENTS

| | | | | |
|---|---|---|---|---|
| 5,108,201 | * | 4/1992 | Matsuura et al. ..................... | 385/143 |
| 5,497,445 | * | 3/1996 | Imoto ................................... | 385/143 |
| 5,837,804 | * | 11/1998 | Yamagishi et al. .................. | 528/353 |

FOREIGN PATENT DOCUMENTS

| | | |
|---|---|---|
| 4-9807 | 4/1992 | (JP) . |
| 4-281406 | 10/1992 | (JP) . |
| 06162550 * | 6/1994 | (JP) . |
| 7-20331 | 1/1995 | (JP) . |

OTHER PUBLICATIONS

Beuhler et al., "Fabrication of Low Loss Polyimide Optical Waveguides Using Thin–Film Multichip Module Process Technology", IEEE Transactions on Components, Packaging, and Manufacturing Technology—Part B, vol. 18, No. 2, May 1995, pp. 232–234.*
Hida et al., "Polymer Waveguide Thermooptic Switch with Low Electric Power Consumption at 1.3 um", IEEE Photonics Tecnology Letters, vol. 5, No. 7, Jul. 1993, pp. 782–784.*
Ido et al., "A 1 × 8 digital–optical switch using fluorinated–polyimide waveguides", OFC '98 Technical Digest, Feb. 1998, pp. 148–149.*
Electronics Letters, vol. 29, pp. 2107–3109 (1993).
IEEE Phontonics Technology Letters, vol. 5, pp. 782–784 (1993).
21–st European Conference on Optical Communication (ECOC'95) pp. 1059–1062 (1995).

* cited by examiner

Primary Examiner—John D. Lee
Assistant Examiner—Michelle R. Connelly-Cushwa
(74) Attorney, Agent, or Firm—Kenyon & Kenyon

(57) ABSTRACT

The following are disclosed: An optical wave-guide constituted out of polymers, an optical integrated circuit, an optical module, and an optical communication system (optical communication apparatus) using these. In the polymer optical waveguide which is fabricated on a substrate having an inorganic material on at least a part of the surface thereof and in which a core layer and a clad layer positioned closer to the base than the core layer are composed of polymers, a buffer layer, which is composed of a polymer different from that of the clad layer, is provided between the clad layer and the base.

12 Claims, 6 Drawing Sheets

1: SUBSTRATE
2: LOWER CLAD LAYER
3: CORE LAYER
4: UPPER CLAD LAYER
5: BUFFER LAYER

1: SUBSTRATE
2: LOWER CLAD LAYER
3: CORE LAYER
4: UPPER CLAD LAYER
5: BUFFER LAYER

7: PHOTOSENSITIVE CORE LAYER

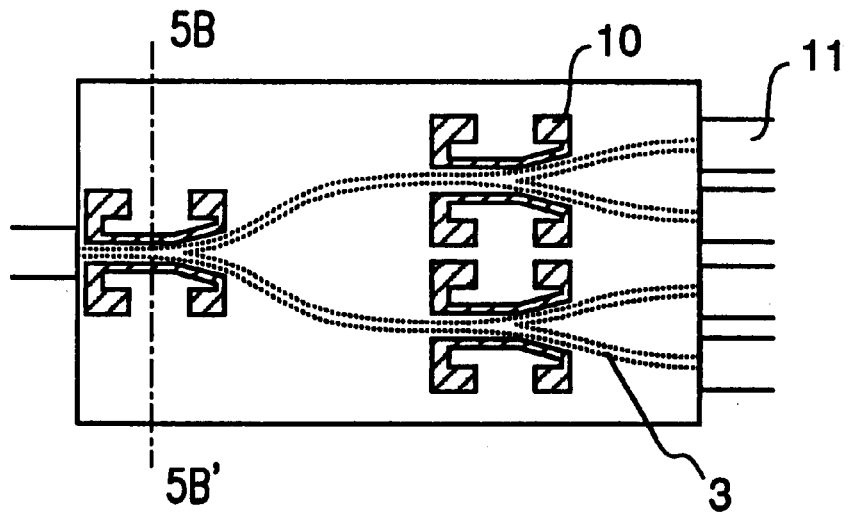
FIG. 5A PLAN VIEW
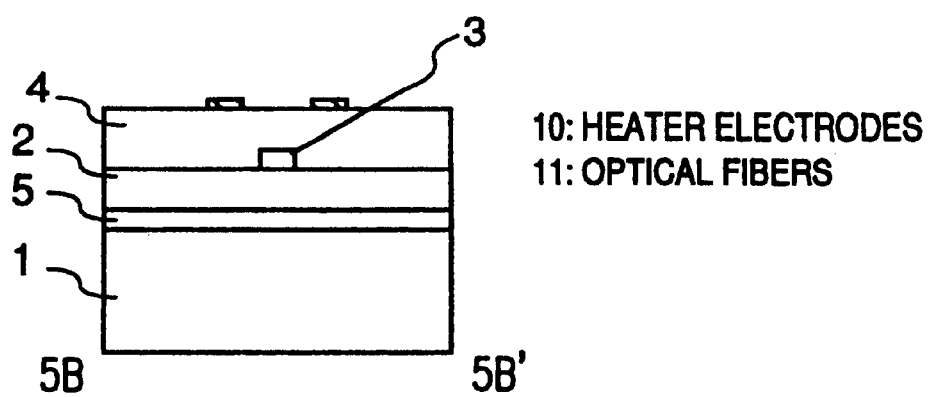
10: HEATER ELECTRODES
11: OPTICAL FIBERS
FIG. 5B 5B-5B' CROSS-SECTION VIEW

20: OPTICAL TRANSMISSION APPARATUS

40: SiO2 FILM
41: ELECTRODE
42: LASER DIODE
43: WAVEGUIDE TYPE PHOTODIODE

POLYMER OPTICAL WAVEGUIDE, OPTICAL INTEGRATED CIRCUIT, OPTICAL MODULE AND OPTICAL COMMUNICATION APPARATUS

TECHNICAL FIELD

The present invention relates to an optical waveguide formed out of polymers, an optical integrated circuit, an optical module, and an optical communication system (optical communication apparatus) using these.

BACKGROUND ART

Nowadays, with the objective of downsizing, cost-lowering and multi-functioning of optical components, research is being done more and more vigorously concerning optical waveguides and an optical integrated circuit using them. Of the optical waveguides, a polymer optical wave-guide in particular, which is fabricated by coating polymer materials on a substrate, is superior in the mass-productivity and can be expected to be lowered in the cost. Accordingly, in recent years, much attention has been focused thereon.

FIG. 10 shows an embedded type optical waveguide, i.e. an example of conventional polymer optical waveguides. The optical waveguide is fabricated by coating, in turn, a polymer (the refractive index: n1) constituting a lower clad layer 2 and a polymer (the refractive index: n2) constituting a core layer 3 on a substrate 1 such as silicon or glass, and then by coating again a polymer (the refractive index: n3) constituting an upper clad layer 4 after removing an unnecessary portion of the core layer by an etching. In order for the optical waveguide to function as an optical waveguide, n2 is set to be larger than n1, n3. Also, so as to facilitate a connection with an optical fiber as well as to embody a single mode optical waveguide, the polymer material in each layer is selected so that the core layer 3 becomes about 6×6~9×9 $\mu$m thick and refractive index differences between the core layer 3 and the clad layers 2, 4 become about 0.3~0.7%. Moreover, in order to decrease a propagation loss through an optical waveguide in the above-described polymer optical waveguide, it is necessary to employ polymers of less optical absorption in the lower clad layer 2, the core layer 3 and the upper clad layer 4. In application of an optical fiber communication, it is necessary to lower the waveguide loss for the infrared light (wave length 1.3~1.5 $\mu$m). However, an ordinary polymer has much CH (carbon-hydrogen) bonds in the structure and has a strong absorption for the infrared light wave because of the absorption by vibration of the CH bonds. Thus, the ordinary polymer is unsuitable for an optical waveguide material for the infrared light. As the optical waveguide material for the infrared light, a polymer in which fluorine (F) or deuterium (D) is substituted for hydrogen (H) in the CH bonds is used. In particular, a fluorinated polymer in which the fluorine substitution is performed has the following excellent properties: For example, the polymer has low loss even for 1.5 $\mu$m band and, because the water-repellent characteristic is caused by fluorine, the loss does not increase even when the polymer is used under high humidity. Fluorinated polyimide and fluorinated polymer acrylic, for instance, can be mentioned as the optical fluorinated polymer. Regarding the fluorinated polyimide and a polymer optical waveguide fabricated using it, the description is given in, for example, JP-A-4-9807 and "Electronics Letters", vol. 29, pp. 2107–3109 (1993).

An optical switch taking advantage of a thermo-optical effect, for instance, can be mentioned as an optical integrated circuit using the polymer optical waveguide. Concerning this, the description is given in literatures such as "IEEE Photonics Technology Letters", Vol. 5, pp. 782–784 (1993) and Proceedings of 21-st European Conference on Optical Communication (ECOC'95) 1059–1062 (1995).

Generally speaking, however, because the C—F bonds are very stable, the optical polymer containing fluorine is inferior in an adhesiveness to inorganic materials such as silicon or glass. On account of this, there exists a problem that a delamination occurs between the substrate 1 and the lower clad layer 2 while or after fabricating the optical waveguide. On account of this, there exist problems that it is difficult to fabricate the optical waveguide with the use of the polymer containing fluorine and having the excellent optical characteristics, and that it is impossible to obtain a long-term reliability of the optical waveguide and the optical integrated circuit thus fabricated. As a technique for enhancing the adhesiveness between the polymer containing fluorine and the inorganic base, JP-A-7-174930 discloses a method in which, by coating and baking organic zirconium chelate on the inorganic substrate, organic zirconium compounds are formed and, after that, the fluorinated polymer is coated. However, adhesion strength obtained by using the organic zirconium chelate is not necessarily enough from the view point of the practical utilization. For example, there exists a problem that, if the optical waveguide, after being fabricated by the above-mentioned method, is left under high temperature and high humidity, there occurs a delamination between the substrate and the lower clad layer in much the same way.

In the polymer optical waveguide fabricated by coating the optical polymer on the inorganic base, an object of the present invention is to provide a highly reliable polymer optical waveguide in which the adhesiveness between the lower clad layer and the substrate is enhanced, and a highly reliable optical integrated circuit. Moreover, another object is to provide, by employing them, an optical module and an optical communication system that are excellent at the long-term reliability.

In a polymer optical waveguide which is fabricated on any substrate of a silicon base, a glass base, a silicon base provided with an oxide film on at least a part of the surface thereof, and a substrate having a metallic electrode on at least a part of the surface thereof, and in which a core layer and a clad layer positioned closer to the base than the core layer are made of polymers, a buffer layer made of a polymer is provided between the clad layer positioned closer to the base than the core layer and the base, and a polymer having a strong adhesiveness to the base is employed as the buffer layer. In particular, a polymer containing no fluorine is employed as the buffer layer. Otherwise, in particular, a polymer containing silicon is employed as the buffer layer. Otherwise, in particular, when fluorinated polyimide is employed as the clad layer, polyimide siloxane is employed as the buffer layer. The polymer optical waveguides having the buffer layer are used so as to constitute an optical integrated circuit, an optical switch and an optical module. Furthermore, they are used so as to constitute an optical communication system, thereby making it possible to achieve the above-described objects.

DISCLOSURE OF INVENTION

In a polymer optical waveguide which is fabricated on any substrate of a silicon substrate, a glass substrate, a silicon substrate provided with an oxide film on at least a part of the surface thereof, and a base having a metallic electrode on at least a part of the surface thereof, and in which a core layer and a clad layer positioned closer to the base than the core layer are made of polymers, a buffer layer made of a polymer is provided between the clad layer positioned closer to the base than the core layer and the base, and a polymer having a strong adhesiveness to the base is employed as the buffer layer. In particular, a polymer containing no fluorine is employed as the buffer layer. Otherwise, in particular, a polymer containing silicon is employed as the buffer layer. Otherwise, in particular, when fluorinated polyimide is employed as the clad layer, polyimide siloxane is employed as the buffer layer. The polymer optical waveguides having the buffer layer are used so as to constitute an optical integrated circuit, an optical switch and an optical module. Furthermore, they are used so as to constitute an optical communication system, thereby making it possible to solve the above-described objects.

BRIEF DESCRIPTION OF DRAWINGS

FIGS. 5(a) and 5(b) are a plan view and a cross-sectional view of a 1×4 branching type optical switch related with the embodiment of the present invention.

BEST MODE FOR CARRYING OUT THE INVENTION

Figure 1:
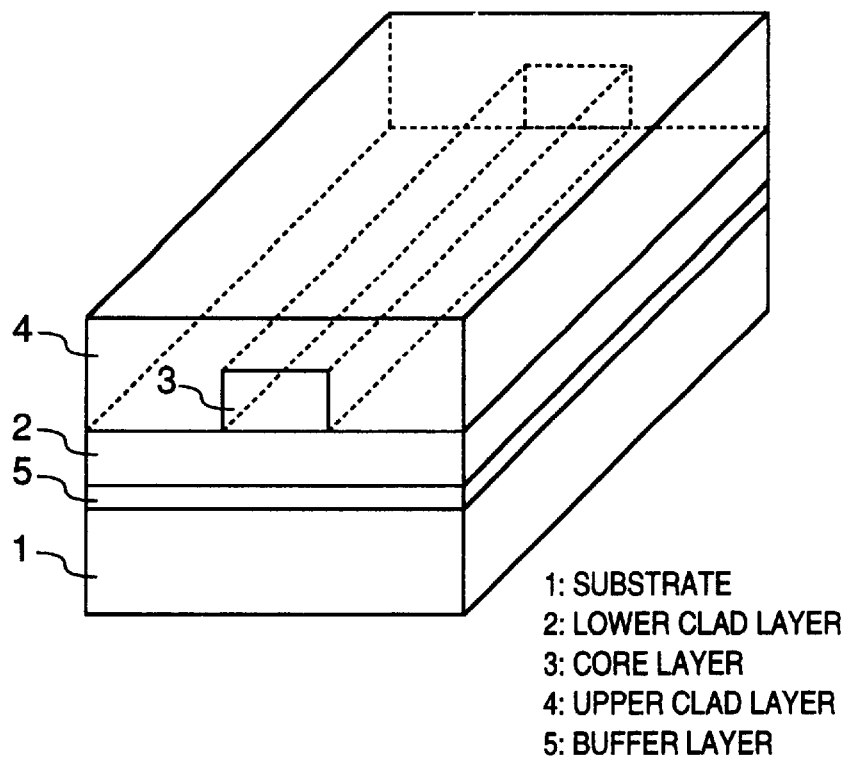
FIG. 1 is a structure diagram of an embedded type polymer optical waveguide related with an embodiment of the present invention.
Figure 2:
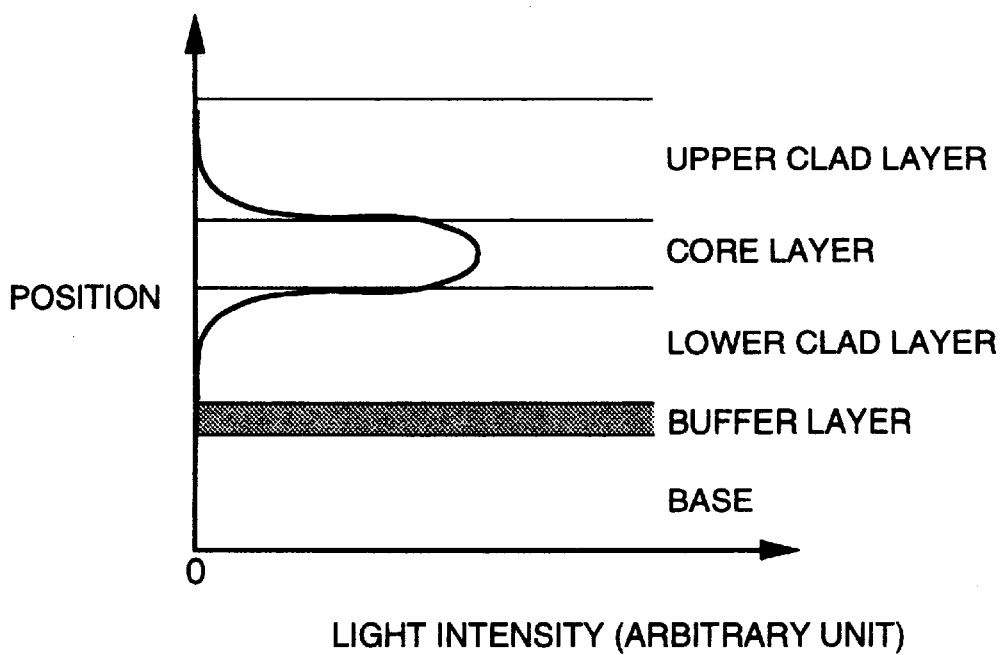
FIG. 2 is a diagram showing a light intensity distribution in a direction perpendicular to a base in the polymer optical waveguide related with the embodiment of the present invention.

FIG. 1 shows an embedded type polymer optical waveguide related with an embodiment of the present invention. First, using this, the explanation will be given concerning functions of the present invention. The optical waveguide of the present invention, between a base 1 and a lower clad layer 2, has a buffer layer 5 constituted by a polymer having a strong adhesiveness to the base. As illustrated in FIG. 2, in the present structure, the lower clad layer 2 is made thick enough so that the optical field scarcely reaches to the buffer layer 5. Consequently, even if a polymer of large absorption loss is employed as the buffer layer 5, the loss in the optical waveguide does not increase. Also, similarly, since the lower clad layer 2 is set to be thick enough, the light wave can propagate through the optical waveguide no matter what value a refractive index of the polymer in the buffer layer takes. Namely, in the present structure, the optical properties of the polymer constituting the buffer layer 5 exert little influence on the optical characteristics of the optical waveguide. This makes it possible to employ, as the buffer layer 5, an arbitrary polymer having a high adhesiveness to the base, ignoring the optical properties. Also, polymers generally have a high adhesiveness to each other, and thus it is easy to set, as the buffer layer 5, a material that has a high adhesiveness to the lower clad layer 2 as well as to the base. Accordingly, it is possible for the present invention to provide a polymer optical waveguide that has a stronger adhesiveness and a higher reliability than in the conventional optical waveguide.

For example, when fluorinated polyimide is employed as the lower clad layer 2, an ordinary polyimide containing no fluorine is employed as the buffer layer 5. This employment allows an enhancement of the adhesiveness to the base, and also makes it possible to embody the strong adhesiveness between the lower clad layer and the buffer layer as well. If it is desirable to enhance the adhesiveness to the substrate even further, it is appropriate to employ as the buffer layer 5 polyimide siloxane that owns Si atoms in the molecular structure and has a strong self-adhesion property to silicon and SiO2. Also, when the lower clad layer is composed of a fluorinated acrylic polymer, it is appropriate to employ as the buffer layer an acrylic polymer containing no fluorine. Also, when the lower clad layer is composed of fluorinated polycarbonate, it is appropriate to employ as the buffer layer polycarbonate containing no fluorine.

Next, using FIG. 1, the explanation will be given concerning a concrete method of carrying out the present invention. First, a N,N-dimethyl acetamide solution of polyamic acid, i.e. a precursor of the polyimide siloxane, is coated on the silicon base 1 by a spinner and baked, thereby forming the buffer layer 5 (1.5 μm thick) made of the polyimide siloxane. Here, as the polyimide siloxane, a substance represented by a structural formula:

[chemical formula I]

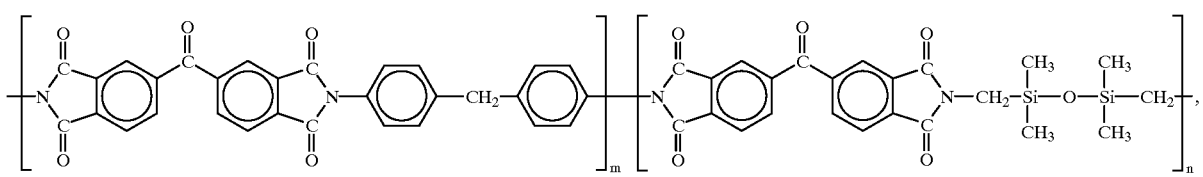

i.e. a polymerization product of benzophenon tetra-carboxylic dianhydride (BTDA), methylene dianiline (MDA) and bis-gamma aminoptopyltetramethyl disiloxane (GAPD), has been used.

In addition, N,N-dimethyl acetamide solutions of the polyamic acid, i.e. precursors of two kinds of fluorinated polyimide A, B, are each coated and baked, thereby forming the lower clad layer 2 (10 μm thick) made of the fluorinated polyimide A and a core layer 3 (7 μm thick) made of the polyimide fluoride resin B. The fluorinated polyimide A is a substance represented by a structural formula:

[chemical formula II]

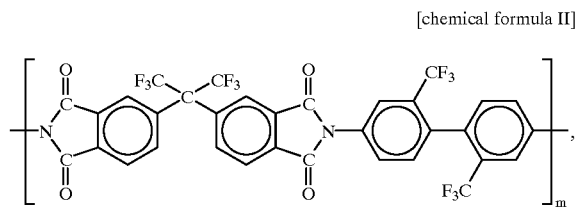

i.e. a polymerization product of 2,2'-bis(trifluoro-methyl)-4,4'-diaminobiphenyl (TFDB) and 2,2-bis(3,4-dicarboxyphenyl) hexafluoropropane dianhydride (6FDA). Also, the fluorinated polyimide B is a substance represented by a structural formula:

[chemical formula III]

Figure 3:
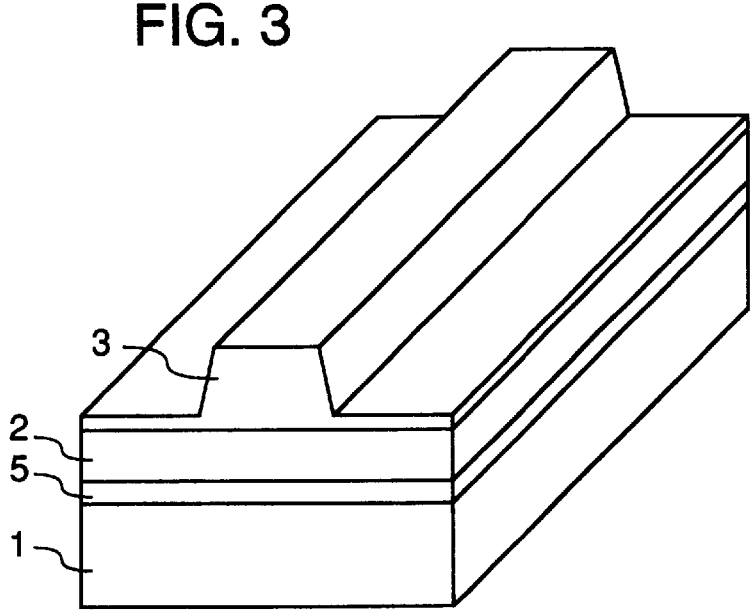
FIG. 3 is a structure diagram of a ridge type polymer optical waveguide related with the embodiment of the present invention.
Figure 4:
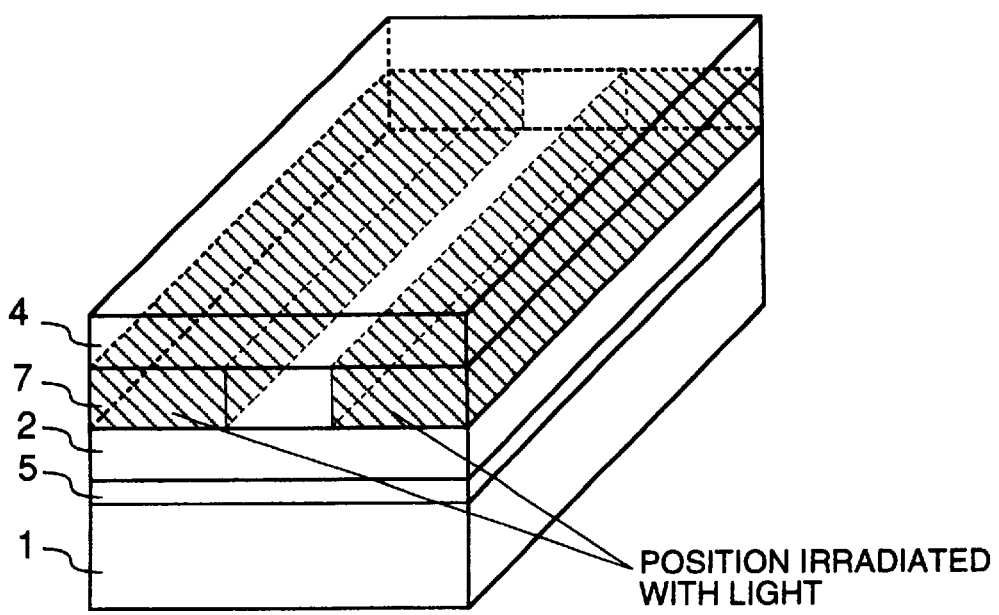
FIG. 4 is a structure diagram of a polymer optical waveguide related with the embodiment of the present invention and fabricated using a photosensitive polymer in a portion of the optical waveguide.
Figure 10:
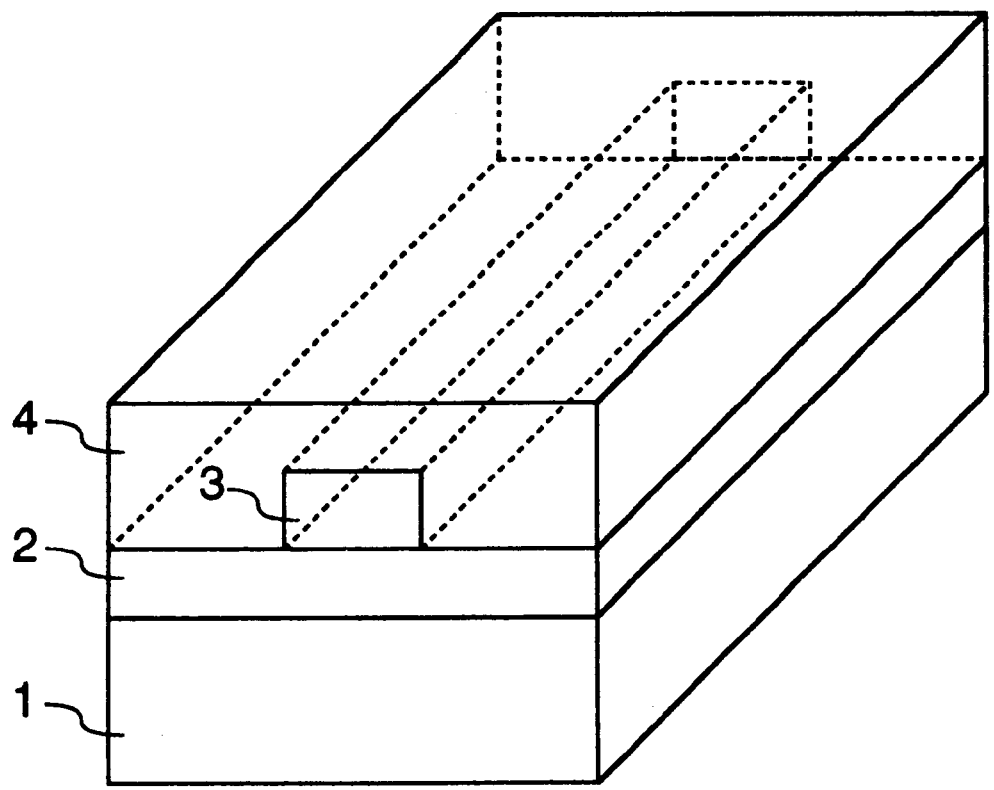
FIG. 10 is a diagram showing a conventional polymer optical waveguide.

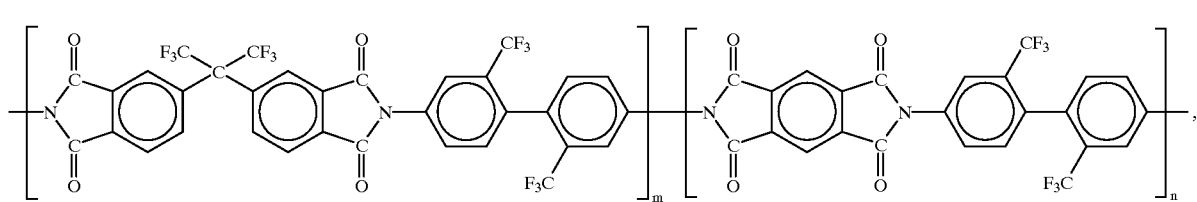

i.e. a polymerization product of TFDB, 6FDA and pyromellitic dianhydride (PMDA). A ratio between 6FDA and PMDA (namely, a ratio between m and n) has been taken as 4:1 so that a refractive index of the core layer 3 becomes about 0.3% greater than a refractive index of the lower clad layer 2. Next, a portion of the core layer 3 is removed by a reactive oxygen ion etching so as to form a waveguide pattern. Moreover, the N,N-dimethyl acetamide solution of the polyamic acid, i.e. the precursor of the fluorinated polyimide A, is coated and baked, thereby providing an upper clad layer 4 (10 μm thick). A propagation loss in the optical waveguide thus fabricated has turned out to be 0.3 dB/cm at wavelength of 1.3 μm. This is a value equivalent to and as small as a value in the conventional optical waveguide (FIG. 10) fabricated using the same polyimide fluoride resin and having no buffer layer. When having conducted a thermal cycle test on the fabricated waveguide, there has occurred a delamination between the lower clad layer 2 and the base 1 in the conventional device having no buffer layer. Meanwhile, in the device using the buffer layer, no delamination has been found and thus enhancements in the adhesiveness and the long-term reliability have been confirmed. The above-described explanation has been given concerning, in particular, the case in which the embedded type optical waveguide is fabricated using the etching. However, regarding a ridge type optical waveguide having no upper clad layer, too, the present invention can be carried out similarly as is illustrated in FIG. 3. Also, the present invention can be carried out similarly as is illustrated in FIG. 4 regarding as well an embedded type optical waveguide that is fabricated by using a photosensitive polymer in the core layer and letting a portion thereof be irradiated with light wave so as to make the refractive index smaller. Furthermore, the same effects can be expected even if the kind of material of the base and the surface thereof is of any other inorganic material such as SiO2, quarts, SiNx.

Figure 6:
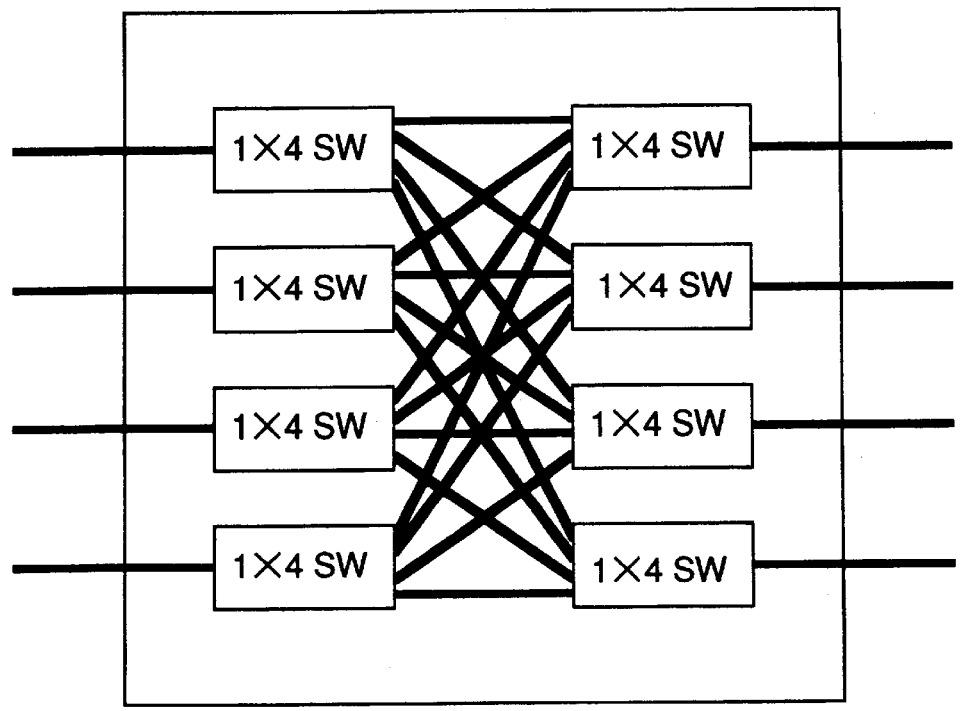
FIG. 6 is a diagram showing a 4×4 optical switch fabricated by combining the 1×4 branching type optical switches related with the embodiment of the present invention.
Figure 7:
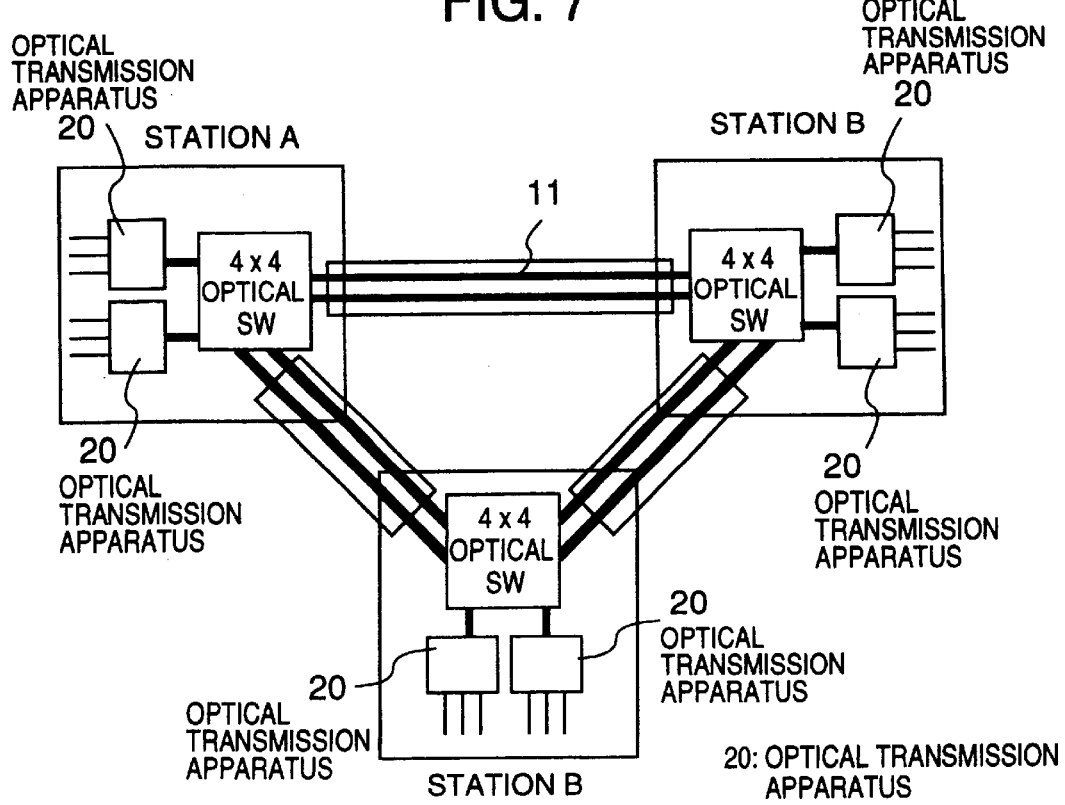
FIG. 7 is a diagram showing an optical fiber communication system in which the optical switches related with the embodiment of the present invention are used.

FIG. 5 shows an optical switch, i.e. an example of the polymer optical integrated circuits related with the embodiment of the present invention. The present 1×4 optical switch has thin film heater electrodes 10 on wave-guides and heats the waveguides by the heaters so as to cause the refractive indexes to be changed, thereby switching among the optical paths. The optical switch has been fabricated in the following process: First, as is the case with the above embodiment, the N,N-dimethyl acetamide solution of the polyamic acid, i.e. the precursor of the polyimide siloxane, and the N,N-dimethyl acetamide solutions of the polyamic acid, i.e. the precursors of the fluorinated polyimide A, B, are coated and baked on a silicon substrate 1 in sequence, respectively, thereby laminating a buffer layer 5 (1.5 μm thick) made of the polyimide siloxane, a lower clad layer 2 (10 μm thick) made of the fluorinated polyimide A, and a core layer 3 (7 μm thick) made of the fluorinated polyimide B. Next, a portion of the core layer is removed by a reactive oxygen ion etching so as to form a waveguide pattern (including branching structures). Next, the amic acid solution, i.e. the precursor of the fluorinated polyimide A, is coated and baked so as to form an upper clad layer 4 made of the fluorinated polyimide A, and then the Cr thin film heaters 10 are provided. Finally, optical fibers 11 (5 units in total) for inputting and outputting light wave are connected and adhere to an end surface of the device. An insertion loss of the optical switch thus fabricated has turned out to be about 4 dB. By feeding an electric power of about 40 mW to each of the heaters, the switching has been performed with an extinction ratio of 20 dB or more. Also, even when an ON-OFF operation of the heater current has been repeated more than 10 thousands times, the polymer has never been delaminated from the base. On the contrary, in an ordinary device having no buffer layer, the ON.OFF operations of the heater current have forced the polymer waveguides to be delaminated from the base. The 1×4 optical switches fabricated have been combined so as to constitute a 4×4 optical switch (FIG. 6). The 4×4 optical switch has been set up at each station so as to constitute an optical communication apparatus (FIG. 7). In the present optical communication apparatus, usually, a station A and a station B, the station B and a station C, and the station C and the station A each perform communication, using a single optical fiber of the shortest possible distance. However, for example, if the optical fiber is disconnected between the station A and the station B, switching of the optical switch at each station makes it possible to perform the communication between the station A and the station B through the optical fiber between the station A and the station C, the optical switch at the station C and the optical fiber between the station C and the station B. The present optical communication apparatus has operated normally over a long period of time.

Figure 8:
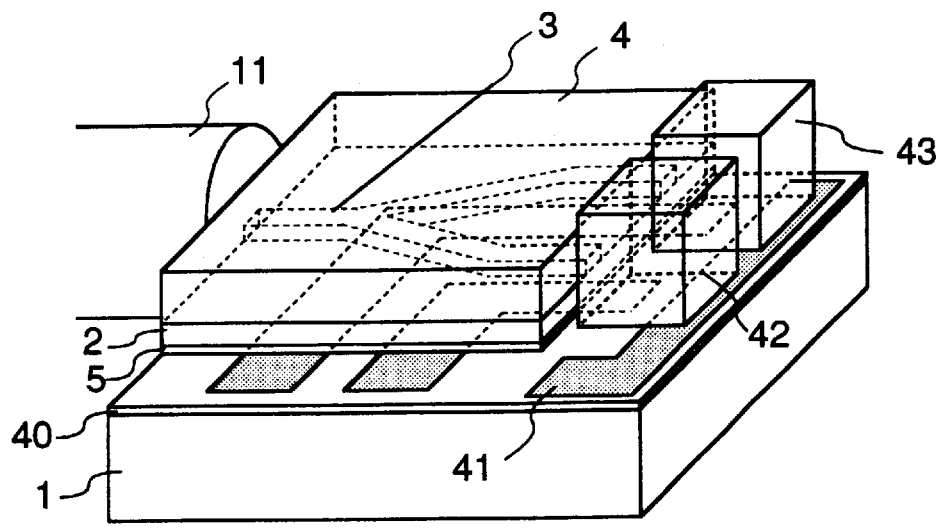
FIG. 8 is a diagram showing an internal structure of an optical module related with the embodiment of the present invention.
Figure 9:
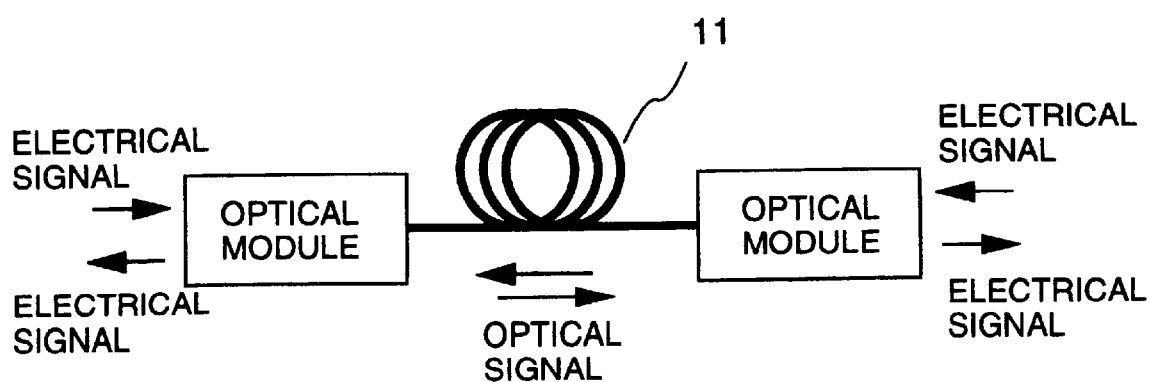
FIG. 9 is a diagram showing an optical communication apparatus in which the optical modules related with the embodiment of the present invention are used.

FIG. 8 shows an internal structure of a laser diode and photodiode module using the polymer optical waveguide related with the embodiment of the present invention. The module has been fabricated in the following process: First, a Cr/Au electrode 41 is provided on a silicon substrate 1 having a SiO2 film 40. As is the case with the above-described embodiments, the N,N-dimethyl acetamide solution of the polyamic acid, i.e. the precursor of the polyimide siloxane, and the N, N-dimethyl acetamide solutions of the polyamic acid, i.e. the precursors of the fluorinated polyimide A, B, are coated and baked on the silicon substrate 1 in sequence, respectively, thereby laminating a buffer layer 5 (1.5 μm thick) made of the polyimide siloxane, a lower clad layer 2 (10 μm thick) made of the fluorinated polyimide A, and a core layer 3 (7 μm thick) made of the fluorinated polyimide B. Next, a portion of the core layer is etched by the reactive oxygen ion etching so as to form a waveguide pattern (including Y branching structures), and then an upper clad layer 4 is coated. Next, a portion of the polymer layers on the base is completely removed by using the reactive oxygen ion etching, thereby exposing a device mounting area and an electrode extracting area. A laser diode 42 and a wave-guide type photodiode 43 are mounted on the mounting area. Also, an optical fiber 11 is connected and adheres to an end surface of the waveguide. Moreover, the base is put into a metallic package and a hermetic sealing thereof is performed, thus completing the optical module. Next, using two units of the fabricated optical modules, an interactive optical communication apparatus illustrated in FIG. 9 has been fabricated. The interactive optical communication apparatus has operated in a stable condition over a long period of time.

According to the embodiments of the present invention, it is possible to provide a highly reliable polymer optical waveguide, a highly reliable optical integrated circuit and a highly reliable optical module which have a high adhesiveness to the substrates. Also, by employing them to constitute an optical communication apparatus, it is possible to provide a highly reliable optical communication apparatus.

Industrial Applicability

In the embodiments of the present invention, it is possible to provide a highly reliable polymer optical waveguide, a highly reliable optical integrated circuit and a highly reliable optical module which have a high adhesiveness to the substrate. Also, by employing them to constitute an optical communication apparatus, it is possible to provide a highly reliable optical communication apparatus. Accordingly, the industrial availability is extremely immense.

What is claimed is:

1. An optical waveguide, wherein a buffer layer, which comprises a polymer material substantially containing no fluorine, is provided between a substrate the surface of which comprises an inorganic material and an optical waveguide that is formed on said substrate and comprises a polymer material containing fluorine.

2. The optical waveguide as claimed in claim 1, wherein the substrate is selected from the group consisting of a silicon substrate, a glass substrate, a silicon substrate having an oxide film on at least a part of a surface thereof, and a substrate having a metallic electrode on at least a part of a surface thereof.

3. An optical integrated circuit, wherein there is provided said optical waveguide as claimed in claim 1.

4. The optical integrated circuit as claimed in claim 3, wherein a thin film heater is employed on at least a part of a surface of said optical waveguide.

5. The optical integrated circuit as claimed in claim 3, wherein said optical integrated circuit is an optical switch.

6. An optical communication apparatus, wherein said optical switch as claimed in claim 5 is employed.

7. An optical module, wherein a semiconductor laser or a photodiode is bonded on a base having said optical waveguide as claimed in claim 1.

8. An optical communication apparatus, wherein said optical module as claimed in claim 7 is employed.

9. The optical waveguide as claimed in claim 1, wherein a lower clad layer in said optical waveguide comprises a fluorinated polyimide and said buffer layer comprises a polyimide substantially containing no fluorine.

10. The optical waveguide as claimed in claim 1, wherein a lower clad layer in said optical waveguide comprises a fluorinated polyimide and said buffer layer comprises a polyimide siloxane having Si atoms in its molecular structure.

11. The optical waveguide as claimed in claim 1, wherein a lower clad layer in said optical waveguide comprises a fluorinated acrylic polymer and said buffer layer comprises an acrylic polymer substantially containing no fluorine.

12. The optical waveguide as claimed in claim 1, wherein a lower clad layer in said optical waveguide comprises a fluorinated polycarbonate and said buffer layer comprises a polycarbonate substantially containing no fluorine.

* * * * *